(12) United States Patent
Brooks et al.

(10) Patent No.: US 7,392,539 B2
(45) Date of Patent: Jun. 24, 2008

(54) VISUALIZATION OF FIREWALL RULES IN AN AUTO PROVISIONING ENVIRONMENT

(75) Inventors: Patrick J. Brooks, Toronto (CA);
Andrew J. Greff, Stoufville (CA);
Stewart J. Hyman, Toronto (CA);
Artur Keizner, North York (CA)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 10/854,112

(22) Filed: May 25, 2004

(65) Prior Publication Data
US 2005/0262554 A1 Nov. 24, 2005

(30) Foreign Application Priority Data
May 18, 2004 (CA) .................................. 2467603

(51) Int. Cl.
*G06F 17/00* (2006.01)
(52) U.S. Cl. ............................. 726/11; 726/12; 726/14; 709/223; 709/224; 709/225; 715/736; 715/737; 713/188
(58) Field of Classification Search ............. 726/11–12, 726/14, 22; 709/220–221, 218, 249, 223–225; 713/188; 707/9; 715/700, 741, 736–737
See application file for complete search history.

(56) References Cited

U.S. PATENT DOCUMENTS

| 6,009,475 | A | 12/1999 | Shrader | 709/249 |
| 6,098,172 | A | 8/2000 | Coss et al. | 713/201 |
| 6,212,558 | B1 * | 4/2001 | Antur et al. | 709/221 |
| 7,016,980 | B1 * | 3/2006 | Mayer et al. | 709/249 |
| 7,146,639 | B2 * | 12/2006 | Bartal et al. | 726/11 |

FOREIGN PATENT DOCUMENTS

| EP | 0910197 | 9/1998 |
| EP | 1024627 | 1/2000 |

\* cited by examiner

*Primary Examiner*—T. B. Truong
(74) *Attorney, Agent, or Firm*—Ronald A. Kaschak, Esq.; Heslin Rothenberg Farley & Mesiti P.C.

(57) ABSTRACT

Various aspects of the invention provide a method, apparatus, and software for selecting interconnectivity rules for a computer network environment and visualization on a display of a data processing system interconnectivity rules in an auto provisioning environment, including: selecting a network environment specification having characteristics describing the environment, the characteristics including: number of network security tiers, firewalls, and other network constraints; displaying a graphical representation of the selected network environment, including security tiers, and proposed firewalls, to a user on the display; selecting network objects for the selected network environment, the network objects being selected from a group of objects including: operating systems and other software applications having predefined or configurable characteristics including interconnectivity rules, and firewall rules; populating the displayed network environment with the selected objects; determining network interconnectivity requirements in the selected network environment for the selected objects from their characteristics; and displaying graphical visualizations of the selected objects and graphical visualizations of the network interconnectivity requirements of the objects in appropriate regions of the displayed network environment.

3 Claims, 8 Drawing Sheets

VISUALIZATION OF FIREWALL RULES IN AN AUTO PROVISIONING ENVIRONMENT

FIELD OF THE INVENTION

The present invention relates generally to firewalls, and more particularly, to a method and apparatus for visualizing firewall rules in configuration of a computer network environment using auto provisioning.

BACKGROUND OF THE INVENTION

As is well known at the present time, a computer network usually includes a number of interconnected network devices on which software applications reside. The network enables information exchange between the applications residing on different network devices.

The design and implementation of computer network environments, particularly auto provisioning systems is extremely complex, and correspondingly difficult to implement effectively without error. Unfortunately, due to the vagaries of human nature, firewalls have become critical to computer networks to safeguard data and applications against accidental, unauthorized or malicious acts of external people or organizations, such as through the internet, or internally, within an organization. This has caused increased complexity to the design of computer network environments, making it more difficult for the design of effective and appropriate firewalls and the selection of rules for the firewalls. This can be particularly true in auto provisioning systems.

Current known network infrastructure auto provisioning systems do not validate the effectiveness or accuracy of computer network architectures that it receives requests to provision. This essentially forces users of the system to have a clear understanding of what they are submitting to the system. In an auto provisioning system it is useful to have a user interface, such as a Graphical User Interface (GUI) for the submission of requests to the system. The request preparation GUI should provide a very clear end-to-end picture of the requested network environment in order to minimize human error. The user interface should display the system environment, including: (1) servers; (2) applications installed on servers and (3) storage mounted on servers; (4) network structure; and, (5) firewall rules for effecting firewalls in the environment. One limitation is that most GUI's attend to only one or two of these at a time, but not all at once.

It would be convenient if a network firewall application could be configured automatically to protect a network; however, because of the varying, and possibly conflicting, needs of different network systems, firewall applications tend to be complex and require configuration to allow for the needs of the organizations implementing these systems.

For instance, in a shared hosting environment, in performing configuration on that environment, one has to be extremely sensitive to the possibility that a single change could adversely affect numerous network users if requested incorrectly by network support personnel.

Request visualization is not unknown. For instance, Terraspring's Graphical User Interface provides a request visualization graphical user interface—but it does not present a visualization of the firewall rules that will be configured during the fulfillment of the provisioning request (Firewall rule summary and customization may be provided textually within submenus). This approach does not provide a good visual summary of the entire auto provisioning request (as the existence or content of the submenus may not be apparent to users), which opens opportunity to submitting inadequate or incorrect requests to the auto provisioning system.

European Patent Application EP 1024627, published Aug. 2, 2000, directed to a method or apparatus for managing a firewall, discloses a framework for representing firewall-independent security policy, and network topology, but does not explain why rules are present. It does not provide a visualization of the firewall rules that should be configured to enable the user's auto provisioning request in the manner of the present invention.

European Patent Application EP 0910197, published Apr. 4, 1999 appears to be directed to providing network firewalls with dynamic rule processing, but does not provide a visualization of the firewall rules that should be configured to enable the user's auto provisioning request in the manner of the present invention.

OBJECTS AND SUMMARY OF THE INVENTION

We have found that configuration of firewalls in a network environment can be made easier and more reliable by the use of the present invention.

One aspect of the invention provides a method for visualization on a display of a data processing system interconnectivity rules to be provisioned automatically in a network environment, including:

selecting a network environment specification having characteristics describing the environment, the characteristics including: number of network security tiers, firewalls, and other network constraints;

displaying a graphical representation of the selected network environment, including security tiers, and proposed firewalls, to a user on the display;

selecting (network) objects for the selected network environment, the network objects being selected from a group of objects including: operating systems and other software applications having predefined, selectable, or configurable characteristics including interconnectivity rules, and firewall rules;

populating the displayed network environment with the selected objects;

determining network interconnectivity requirements in the selected network environment for the selected objects from their predefined or configurable characteristics; and, displaying graphical visualizations of the selected objects and graphical visualizations of the network interconnectivity requirements of the objects in appropriate regions of the displayed network environment.

Preferably the graphical visualizations of the network objects identify the network objects and populate the firewalls with visualizations of respective firewall rules for the network objects including identification of the respective firewall rules.

Another aspect of the invention provides a system for visualization on a display of a data processing system interconnectivity rules in an auto provisioning environment, including:

apparatus for selecting a network environment specification having characteristics describing the environment, the characteristics including: number of network security tiers, firewalls, and other network constraints;

apparatus for displaying a graphical representation of the selected network environment, including security tiers, and proposed firewalls, to a user on the display;

apparatus for selecting (network) objects for the selected network environment, the network objects being selected from a group of objects including: operating systems and other software applications having predefined or configurable characteristics including interconnectivity rules, and firewall rules;

apparatus for populating the displayed network environment with the selected objects;

apparatus for determining network interconnectivity requirements in the selected network environment for the selected objects from their characteristics; and, apparatus for displaying graphical visualizations of the selected objects and graphical visualizations of the network interconnectivity requirements of the objects in appropriate regions of the displayed network environment.

Still another aspect of the invention provides a computer program embodying computer readable program code for instructing a computer to perform the method of the invention as described above.

Another aspect of the invention provides a computer program product having a computer readable medium tangibly embodying computer readable program code for instructing a computer to perform the method for visualization on a display of a data processing system interconnectivity rules in an auto provisioning environment, comprising:

selecting a network environment specification having characteristics describing the environment, the characteristics including: number of network security tiers, firewalls, and other network constraints;

displaying a graphical representation of the selected network environment, including security tiers, and proposed firewalls, to a user on the display;

selecting (network) objects for the selected network environment, the network objects being selected from a group of objects including: operating systems and other software applications having predefined or configurable characteristics including interconnectivity rules, and firewall rules;

populating the displayed network environment with the selected objects;

determining network interconnectivity requirements in the selected network environment for the selected objects from their characteristics; and, displaying graphical visualizations of the selected objects and graphical visualizations of the network interconnectivity requirements of the objects in appropriate regions of the displayed network environment.

The software embodiment of the invention may be provided as a computer program product such as a storage medium in which computer readable program code is recorded.

It may be appreciated that where advantageous network interconnectivity requirements are determined using predefined characteristics of the objects or from the configurable characteristics after the configurable characteristics have been configured. In another embodiment of the invention, as resources are selected and added to the auto provisioning request via a drag-and-drop graphical user interface (GUI), default firewall rules are (immediately) visualized that would be required for those resources to function and be managed in actual operation.

While the network objects discussed above may preferably have predefined characteristics as defaults, advantageously, the characteristics can be changed by embodiments of the invention on demand through the GUI when creating a request, if these predefined defaults are not what are needed. Request preparation is shortened by the capability of using default values when the defaults are accurate; but the invention provides convenient flexibility to take into account situations in which the defaults are not suitable.

In one embodiment of the invention defaults may be changed by altering firewall rule requirements for the software objects being installed contextually within a specific network environment. For example, in configuration of a network environment designed to communicate over the Internet (in which the network environment has a front security tier for protection from interference from the Internet, and another more secure tier for protecting databases of the network), when a user of an embodiment of the invention (having a configuration screen or panel and a visualization screen) requests that a web server be placed in the front security tier, and that it have an application installed onto it which needs to communicate both forwards (with web clients on the Internet), and backwards (to a database in a more secure tier). The web application object will likely be defined with default rules for HTTP connectivity from the Internet on port 80 of the network. If the user decides that the web server needs to listen to another port, for example, port 8000, the user would alter the firewall rules associated with the web server application object when configuring it in an auto provisioning request. When the user completes this configuration, and moves back to the main request visualization screen of the embodiment of the invention discussed, that new firewall rule which was requested to enable the web server application will be visualized on the front firewall, separating the web server network security tier from the Internet.

A more complete understanding of the present invention, as well as its further features and advantages will be obtained by reference to the following detailed description and drawings.

BEST MODE FOR CARRYING OUT THE INVENTION

Figure 1:
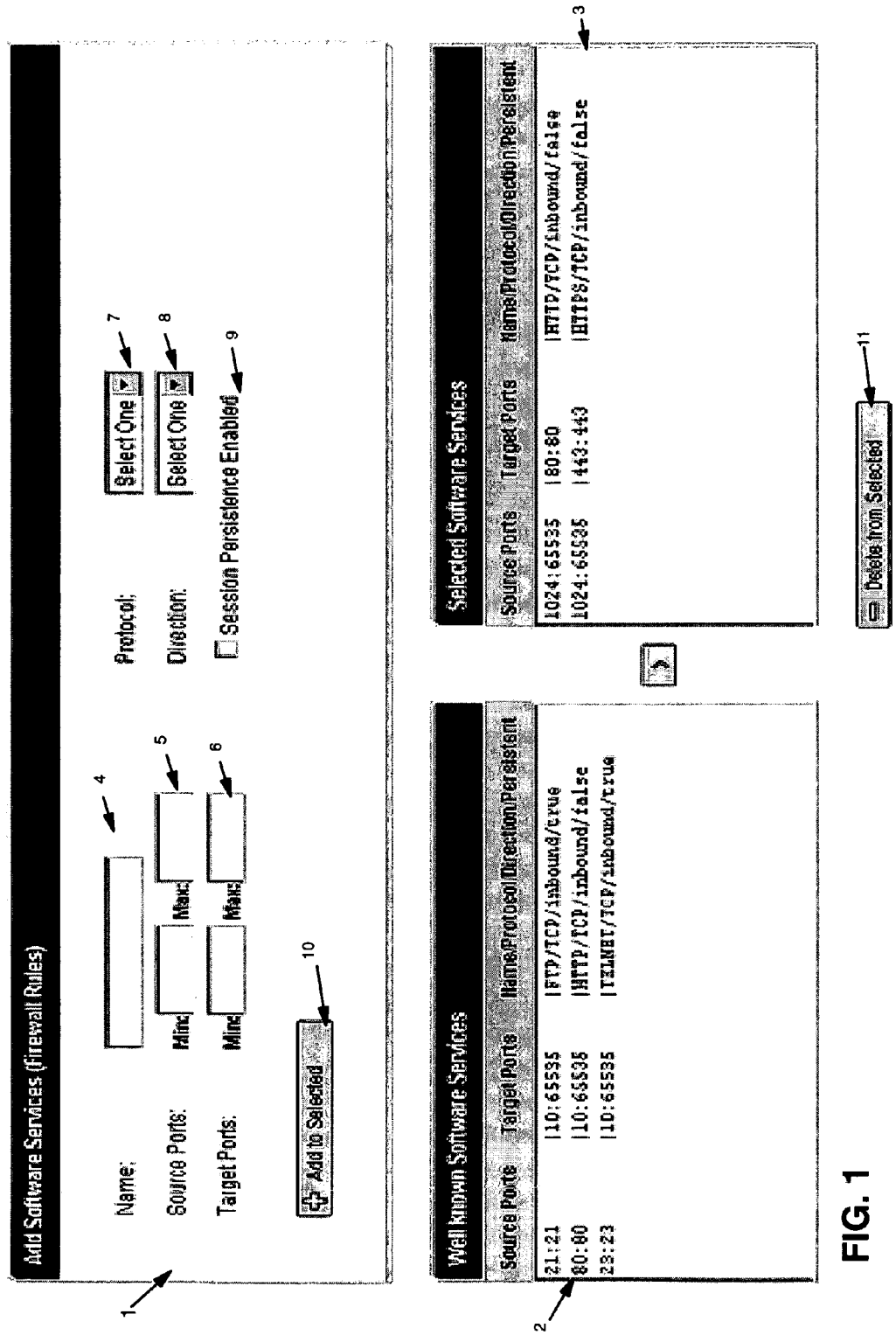
FIG. 1 illustrates network entity firewall rule metadata definition.

In the following section we describe how firewall rule visualization and configuration of this invention work and can be implemented for use with an auto provisioning system.

As resources are selected and added to an auto provisioning request via a drag-and-drop graphical user interface (GUI) of an embodiment of this invention, default firewall rules are immediately visualized that would be required for those resources to function and be managed in actual operation. This visualization is made possible in the invention by the establishment of relationships between network entities to services within an auto provisioning system. An auto provisioning system may provide that network servers will have default firewall rules required for simple management (secure shell (SSH) and file transfer protocol (FTP)), while applications will have default firewall rules required for functionality (web servers typically have hyper text transfer protocol HTTP and secure version HTTPS, DB2 Database Server have ports 50,000 and 50,001, etc.). In accordance with the invention the definition of default firewall rules for new software packages will be provided as well.

The addition of firewall rule visualization to the GUI request generation tool with an auto provisioning system may provide the following benefits beyond that of prior art auto provisioning GUI to date:

The completeness of the visual summary makes it easier for a user to understand what they are asking for. Existing solutions keep firewall rule changes "hidden", e.g., within sub-menus make it more likely that a user will overlook these in the formation of their request. This increases the chance of human error.

Default firewall rules reduce the time required to generate requests via the GUI tool.

Brief Description of How the Firewall Rule Visualization Works

An important element of firewall rule visualization is ability of network entities used in building a network environment to self describe what network services (e.g. firewall rules) are required for operation and how they effect network firewalls. In effect, this means that network entities including operating systems, and software applications in use on the network would be provided with a specification which describes what network services it requires for its operation. The specification is typically created by the servicing organization offering that employs the auto provisioning system with which the invention interacts. For instance, the servicing organization might use one embodiment of the invention, a firewall configuration visualization tool to increase efficiency and time-to-deploy network solutions. For efficiency, assuming a reasonably sophisticated servicing organization, the packaging group of the servicing organization would add installable software packages into the auto provisioning system with default firewall rules, and the servicing organization's deployment group would use these package, by selecting them for installation onto a server through the auto provisioning GUI and then customizing the default firewall rules that had been set up for that application by the packaging group, to fit the specific customer network deployment being configured, only once for any particular network entity type.

While a user is using the firewall visualization configuration tool embodiment of this invention during construction of a proposed network environment request to an auto provisioning system, when a network entity is added to the system, its metadata is loaded and used to alter the setup of the firewalls present in the environment. The environment is repainted for display to the user on a Graphical User Interface (GUI) of the firewall configuration visualization tool to reflect the new firewall setup.

This process repeats until the proposed environment is ready to be submitted to the auto provisioning system.

Note: Firewall rule metadata associated with a network entity can be altered when creating an auto provisioning request for configuration of the network environment. During the process of constructing the environment request the user can add or remove firewall rule requirements from a network entity or modify the configuration parameters of the existing ones. Fixed firewall rules would be best used when a request is coming from an un-trusted source, for instance, directly from external sources, such as network customers, where there would be more concern that changes made by them could adversely affect others. The present invention is, however primarily destined for end-use by specialist users running a managed environment. These users are therefore trusted, and should not have unduly imposed constraints.

Firewall Rule Visualization Implementation for an Auto Provisioning System

One embodiment of the present invention may be advantageously implemented as a firewall configuration visualization tool that may consist of two parts. The first part, a firewall rule metadata definition tool, is used to define firewall rule requirements for network entities (e.g. software applications). The second part, an environment auto provisioning request construction tool, is used to create a request to an auto provisioning system using a GUI for the user's convenience and using metadata specifications defined in the first part.

Defining Firewall Rule Metadata for Network Entities

Referring to FIG. 1 a depiction of convenient user accessible panels is presented by the GUI for defining default firewall rules for a software application specification. Panel 1 provides an entry panel for a user to enter firewall rule specification metadata. Predefined rules are provided in panel 2 for well known firewall rules that enable software. Panel 3 lists user selected firewall rules that enable software, selected from panel 2 with specification metadata specified by the user in panel 1.

During creation of firewall rule metadata definition, a set of firewall rules is associated with each entity. For example, when defining a software application specification that requires a particular firewall rule to allow communication inbound to the software application from the Internet a user can specify that the software application requires a protocol service (firewall rule) to be opened on the firewall protecting that application from the Internet. Thus, when we use the software application specification in the construction of an autoprovisioned environment, a firewall will be automatically configured to allow incoming HTTP service on requested port 80.

When defining a software application specification, predefined and custom firewall rules can be associated with the specification. Referring to panel 1, it may be seen that the firewall rule specification consists of the name, 4, of the service (usually 3-4 character code), range (min, max) of allowed source, 5, and target, 6, ports (a numerical value), transport protocol, 7, (UDP or TCP) and direction, 8, of the service (inbound, outbound or bidirectional).

At the end of the process network entity specification and its associated firewall rule requirements are persisted into a database to be used by the environment request construction tool.

Figure 2:
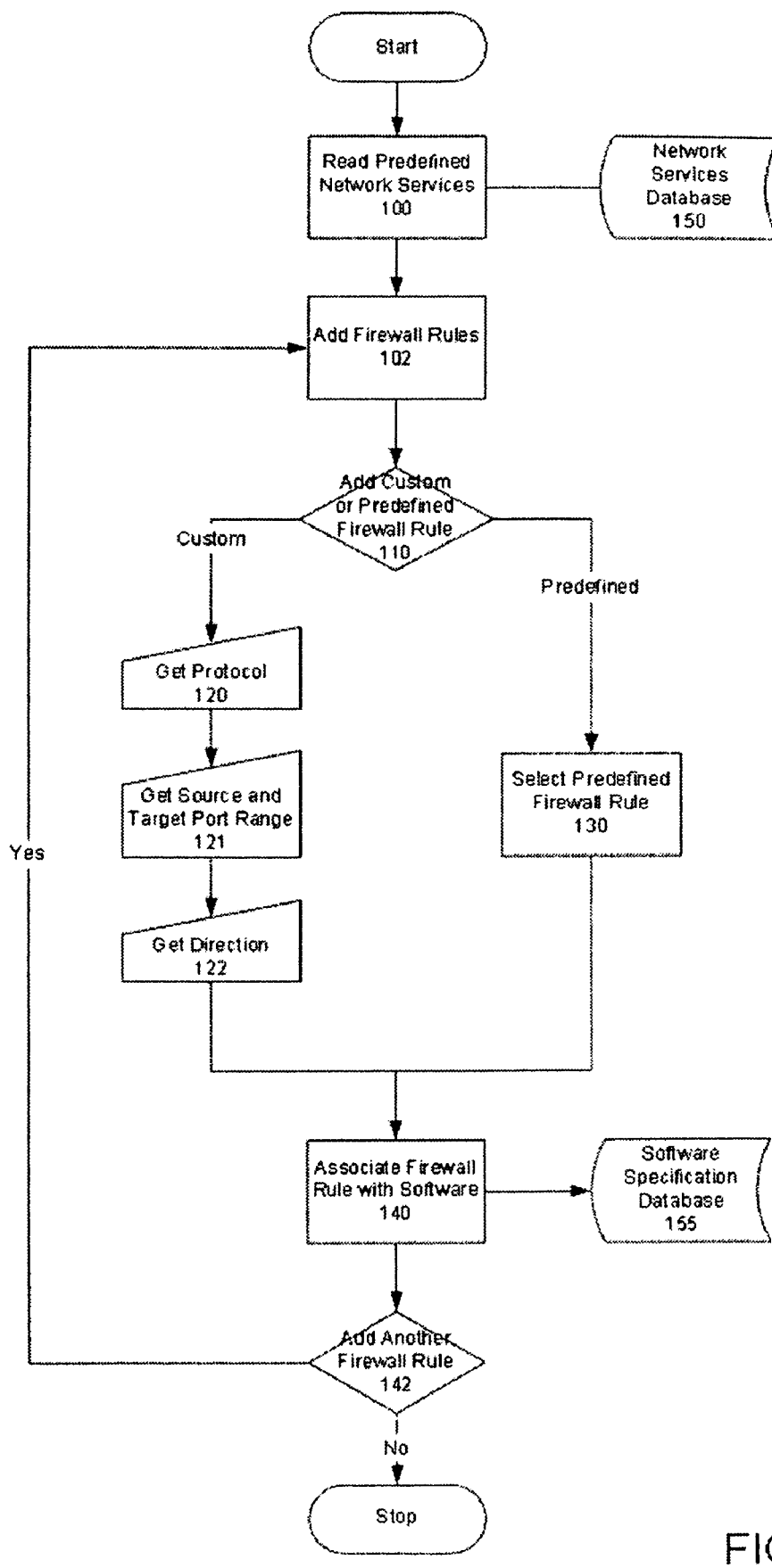
FIG. 2 illustrates a flow chart presenting a firewall rule visualization process during environment request construction.

FIG. 2 depicts a firewall rule visualization process in accordance with this invention which may be used during environment auto provisioning request construction. The chart below depicts the process followed in selecting firewall rules for association with a software application network entity. When the complete set of rules is defined for the software application it can be made available to the auto provisioning tool.

100 Read list of predefined firewall rules from database
150. Any rule from this list can be associated with the software application entity being creating. The list contains a list of services which are commonly used by software.
102 Start process of associating firewall rules to the software application entity.
110 The software application entity can be associated to the firewall rule from the predefined list of services or to a custom, user defined, firewall rule.
120 Collect information regarding protocol of the service i.e. TCP or UDP
121 Collect information regarding source and target port ranges i.e. source 80-80, target 10000-20000

122 Collect information regarding direction of the rule i.e. inbound, outbound, bidirectional 130 Select a firewall rule from the list of predefined firewall rules.

140 Associate the firewall rule with the software application entity and persist the data into database 155.

142 If required associate more firewall rules with this software application, or finish the process of creating the software application entity.

Firewall Rule Visualization Process During Environment Request Construction

Figure 3:
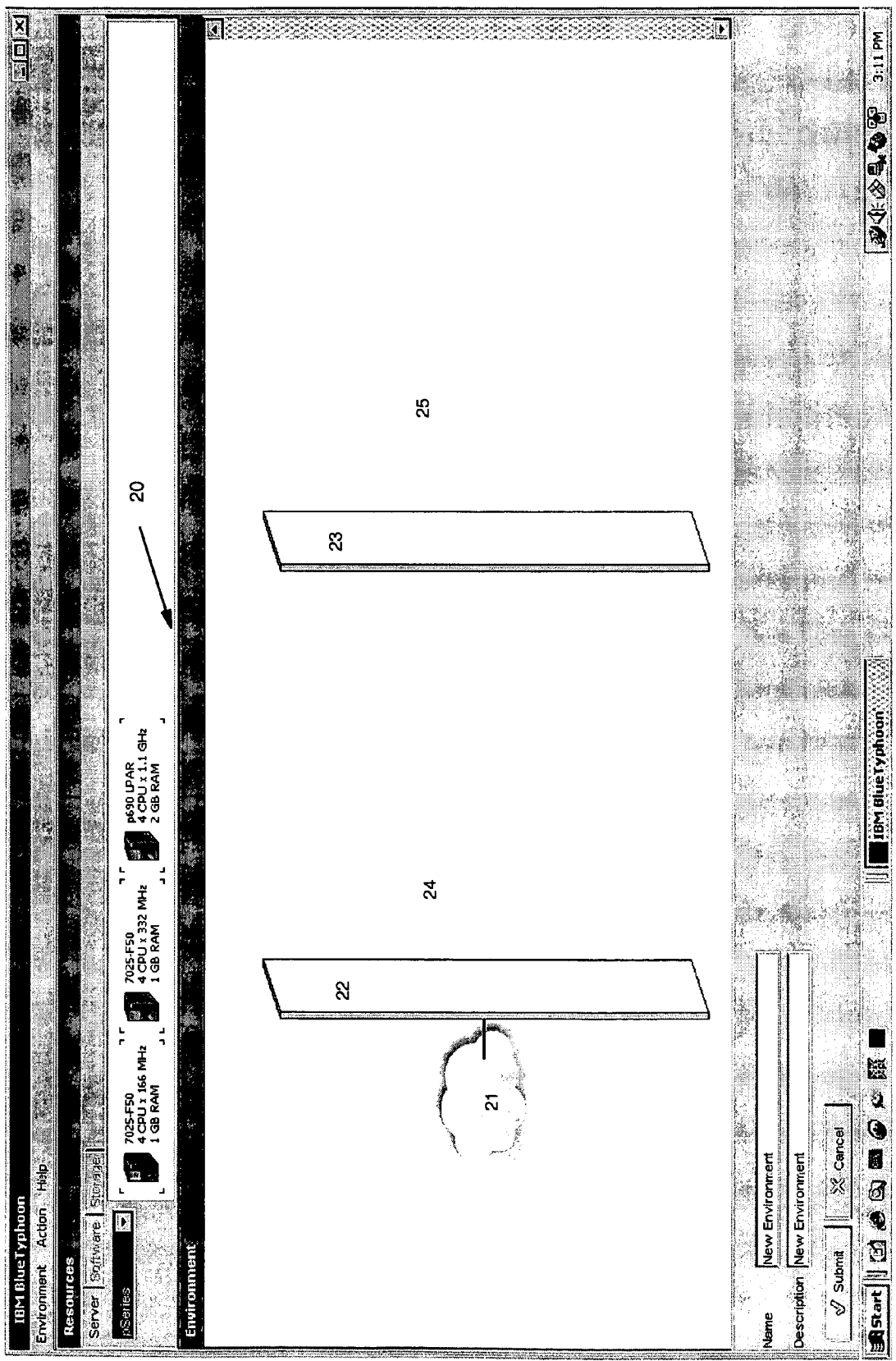
FIG. 3 illustrates an environment with no network entities affecting firewalls.

When a user starts the environment auto provisioning request construction tool of the embodiment of the invention depicted in FIG. 3 the user sees an empty network environment into which the user can place selected network entities like server clusters and software packages. The environment is depicted conceptually as the internet, 21, a network web layer, 24, an interface, 22, which can be set up to protect the network and its applications involved from the internet; a secure database layer 25, and interface, 23, which can be set up to protect the database layer from unauthorized access from the internet 21, and web layer 24. Referring to the upper portion of the FIG. 3 a group of server entities 20 are presented, which can be selected for placement into the network environment.

Figure 4A:
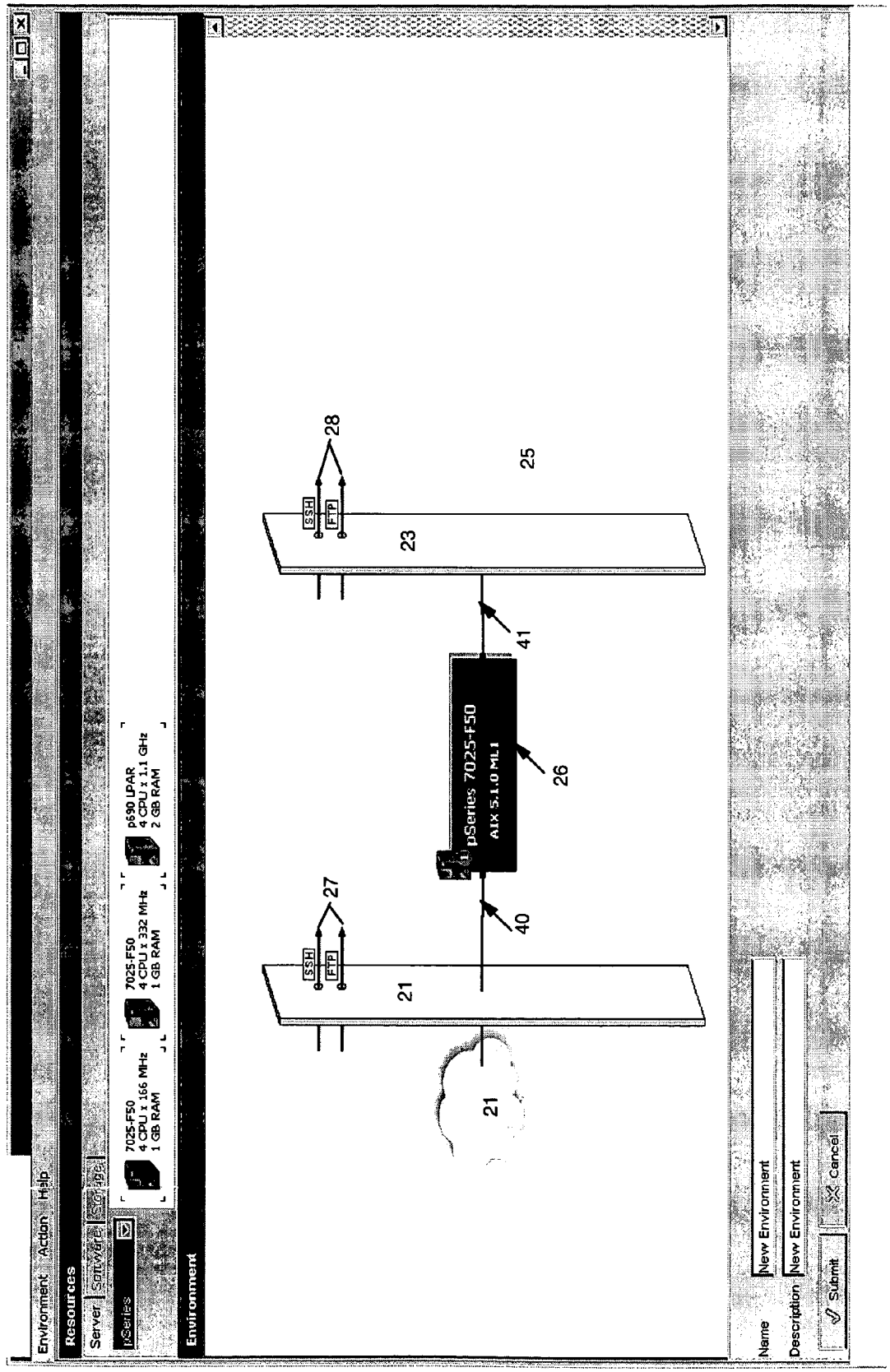
FIG. 4(*a, b, c, d*) illustrates an environment with network entities which affect the setup of firewalls; and depict how the environment changes with the introduction of network objects.
Figure 4B:
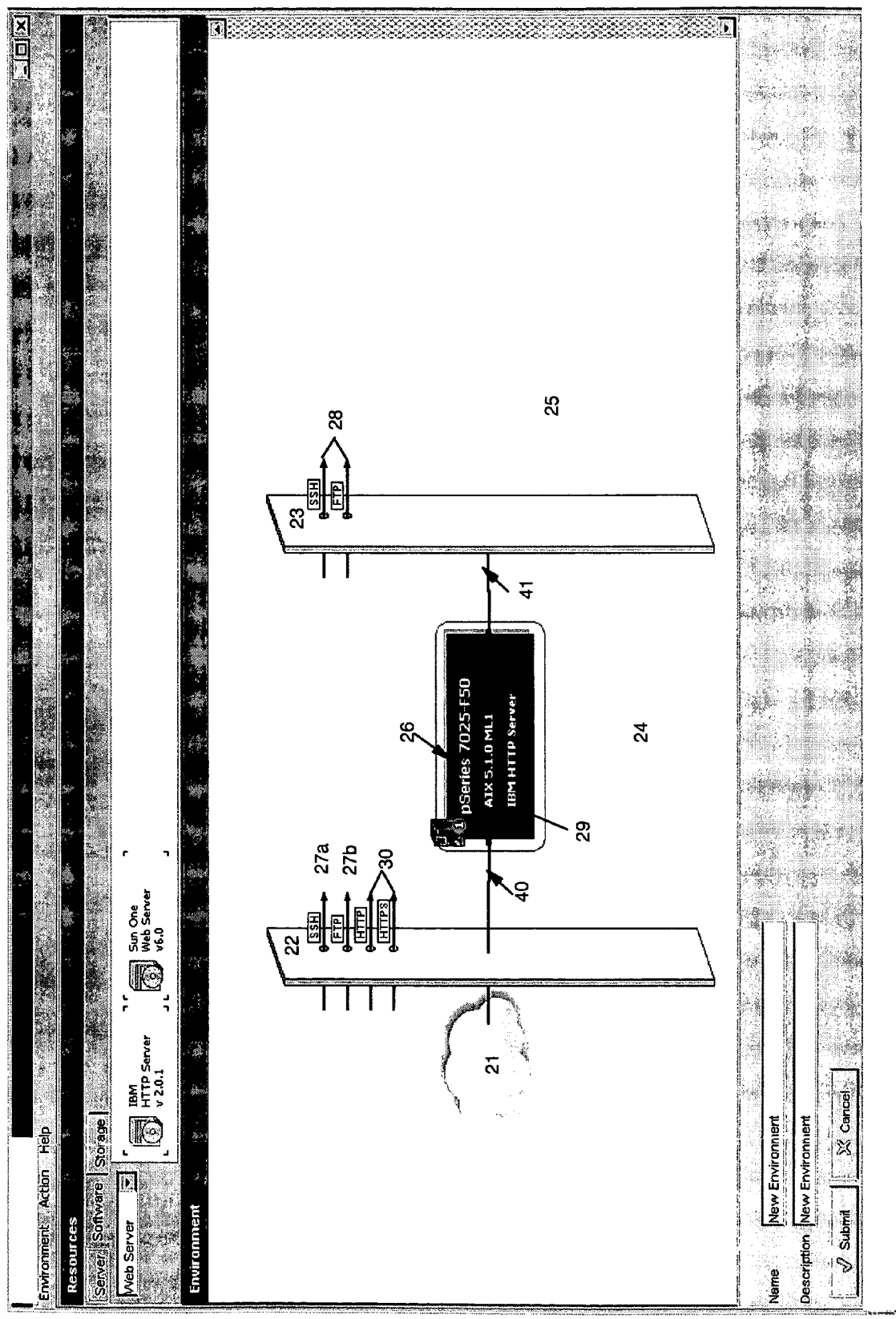
Figure 4C:
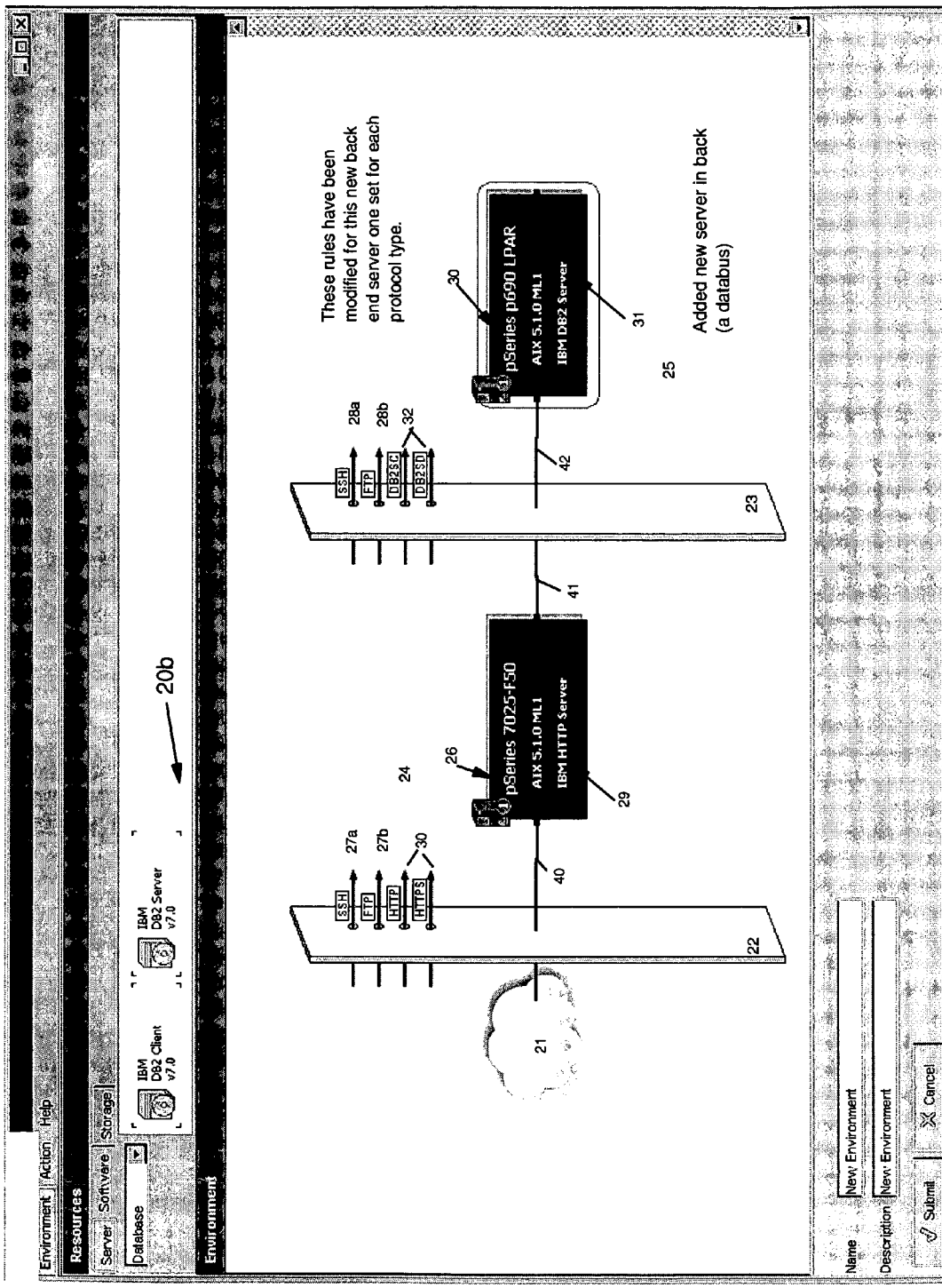
Figure 4D:
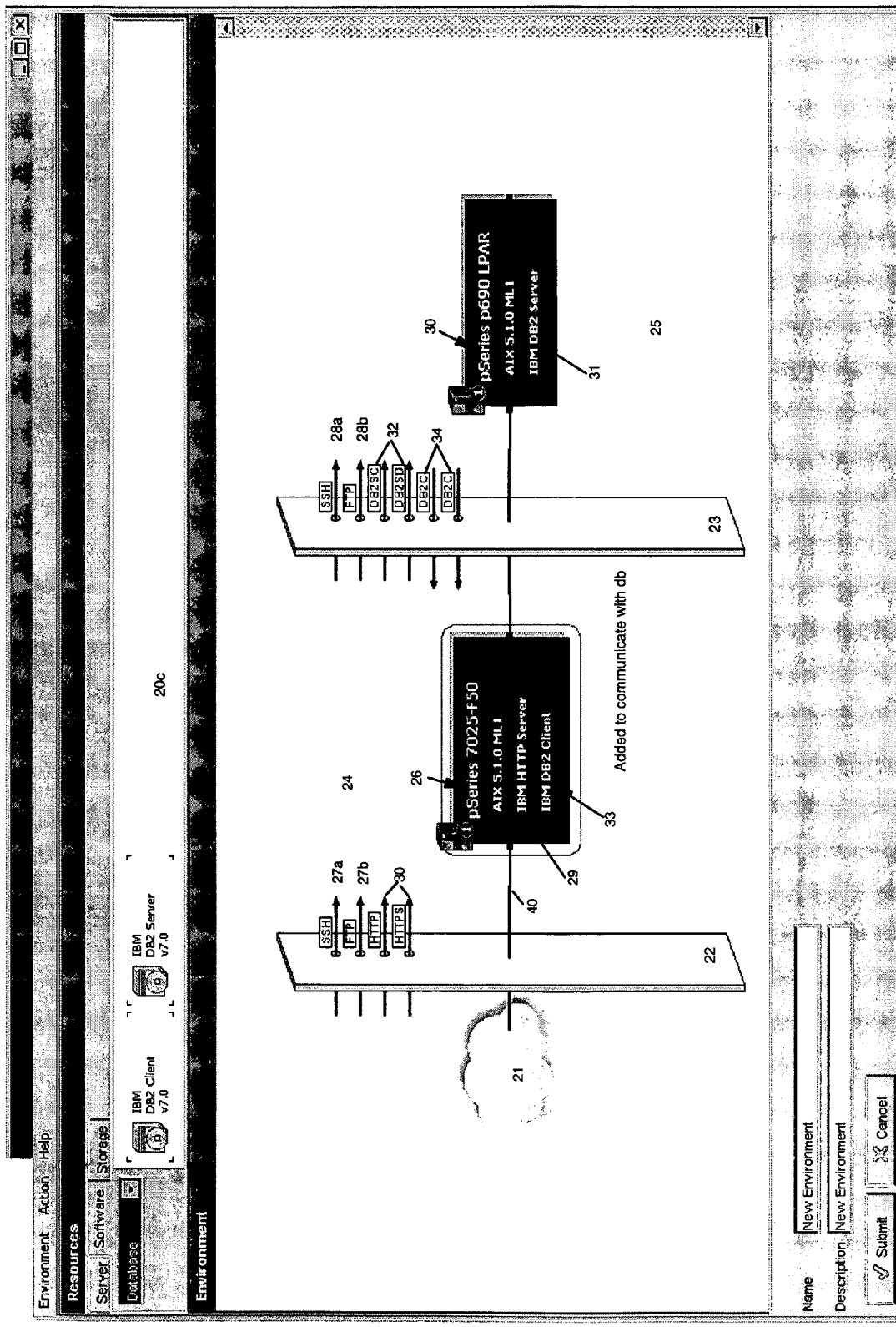

For example, referring to FIG. 4a, we can add a server cluster, 26, consisting of IBM pSeries servers (together with their AIX operating system 26a and other software), selected from the group of servers, 20. When added this cluster carries with it a group of default firewall rules (27, 28 for firewalls 22 and 23 respectively) and network connections (40, 41) for communication between the internet 21, web layer 24, and secure layer 25. These are displayed on the request creation tool. Referring to FIG. 4b, when desired Web Server software (which, in this embodiment requires HTTP service) is selected from displayed objects 20a, and dropped into server cluster panel 26 it appears as element 29 in the server cluster panel 26, along with its attendant firewall rules 30 in firewall 22. Default rules 27a and 27b represent the SSH and FTP daemons required to enable the AIX operating system and web server software application. These are all displayed. Referring to FIG. 4c we have selected a database server from group 20b and dropped it into the secure database layer 25. It appears in a panel with its pSeries hardware 30, and is indicated as element 31. Network connection 42 is also displayed. As may be seen, new firewall rules 30 appear in firewall 22, as well as database firewall rules 32 in firewall 23. Firewall rules 28 are displayed in this diagram as 28a and 28b to reflect that these rules have been added to accommodate the new back end database server 30. Referring to FIG. 4d we have selected a DB2 client from group 20c and dropped it into server 26 so that it can communicate with the database server 31. Firewall rules 34 appear to reflect the communication needed between the new database client 33 and the database server 31. As can be seen, as new network entities are added to the depicted system, the firewalls in the environment are adjusted to include the defined firewall rules for the new network entities and the environment is re-rendered with the firewall rules appearing on the firewalls. This helps the user understand the changes and see the new environment request configuration.

In FIG. 4d we see that after adding AIX operating system 26a, IBM HTTP server 29 and IBM DB2 client 33 to the server cluster 26 in the protected tier 24 (between the two firewalls) has effected the first firewall 22 by opening it to the SSH 27a, FTP 27b, HTTP and HTTPS connections 30 and second firewall 23 by opening it to the outbound DB2C 34 (DB2 client 33) connections. Adding a server cluster 30 in the secure tier 25 (behind the second firewall 23) with AIX operating system 30a and IBM DB2 server 31 has effected second firewall 23 by opening it to the SSH 28a, FTP 28b, DB2SC and DB2SD inbound connections 32.

FIG. 4d: Environment with user requested network entities, and required firewall rules to enable those entities.

Figure 5:
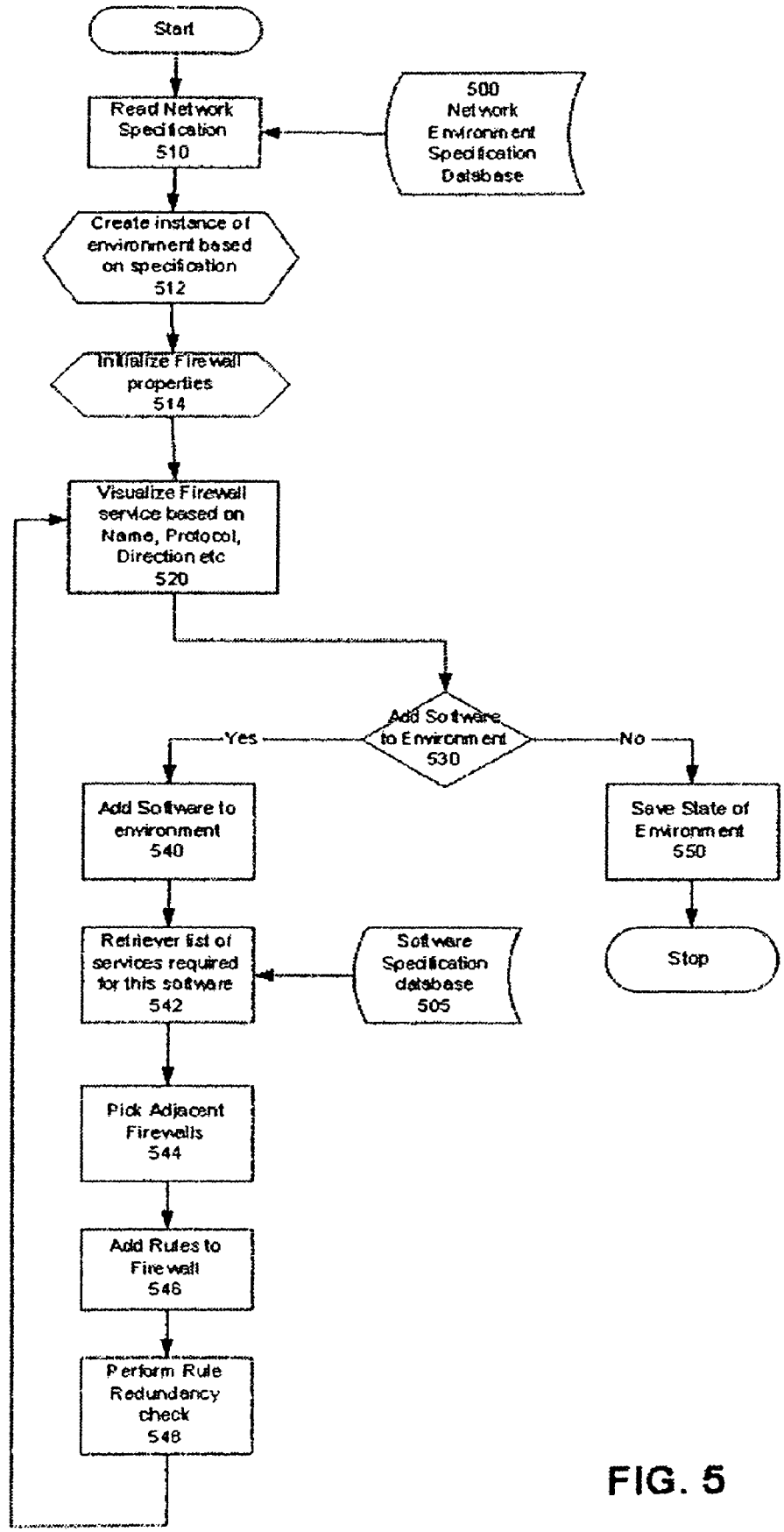
FIG. 5 illustrates a state/activity diagram for computing firewall rule visualization.

FIG. 5, an activity/state diagram depicts how the environment autoprovisioning request creation tool of this embodiment of the invention works to compute the properties of the firewall based on the network entities present in the environment request and display them to the user. The table below depicts the operation of the invention.

510 Read network environment specification from the metadata database 500. The specification contains particulars on number of network security tiers, firewalls and other network environment details.

512 Using the environment specification create the empty network environment instance which will be used to create an auto provisioning request.

514 Initialize each firewall in the environment based on the environment specification constraints.

520 For every firewall in the environment, for all firewall rules in the firewall, render the firewall rule on the user interface along with the name, protocol and direction.

530 User decides if software will be added to servers in the environment or finish environment configuration.

540 Start process of adding software to server in the environment. This is done by selecting a visual representation of server from user interface and dragging it over server.

542 Once the software been selected and dropped on the server, firewall requirements of that software are read from database 505.

544 Calculate which firewalls in the environment are affected by addition of software to the server.

546 For every effected firewall, add the software firewall requirements to the firewall configuration.

548 Check that there are no redundant rules after adding additional rules to the firewall.

550 When the configuration of the environment is complete, save state of entities in the environment, including the configuration of the firewalls and submit it to auto provisioning system.

Although the invention has been described with reference to illustrative embodiments, it is to be understood that the invention is not limited to these precise embodiments and that various changes and modifications may be effected therein by one skilled in the art. All such changes and modifications are intended to be encompassed in the appended claims.

The embodiments of the invention in which an exclusive property or privilege is claimed are defined as follows:

1. A method for selecting interconnectivity rules for a computer network environment and visualization on a display of a data processing system interconnectivity rules in an auto provisioning environment, comprising:

selecting a network environment specification having characteristics describing said environment, said characteristics including: number of network security tiers, firewalls, and other network constraints;

displaying a graphical representation of said selected network environment, including security tiers, and proposed firewalls, to a user on said display;

selecting network objects for said selected network environment, said network objects being selected from a group of objects including: operating systems and other software applications having predefined or configurable characteristics including interconnectivity rules, and firewall rules;

populating said displayed network environment with said selected objects;

determining network interconnectivity requirements in said selected network environment for said selected objects from their characteristics; and displaying graphical visualizations of said selected objects and graphical visualizations of said network interconnectivity requirements of said objects in appropriate regions of said displayed network environment.

2. The method of claim 1, further including configuring said configurable characteristics before determining network interconnectivity requirements.

3. The method of claim 1, wherein said graphical visualizations of said network objects identify said network objects and populate said firewalls with visualizations of respective firewall rules for said network objects including identification of said respective firewall rules.

* * * * *